United States Patent Office 3,450,853
Patented June 17, 1969

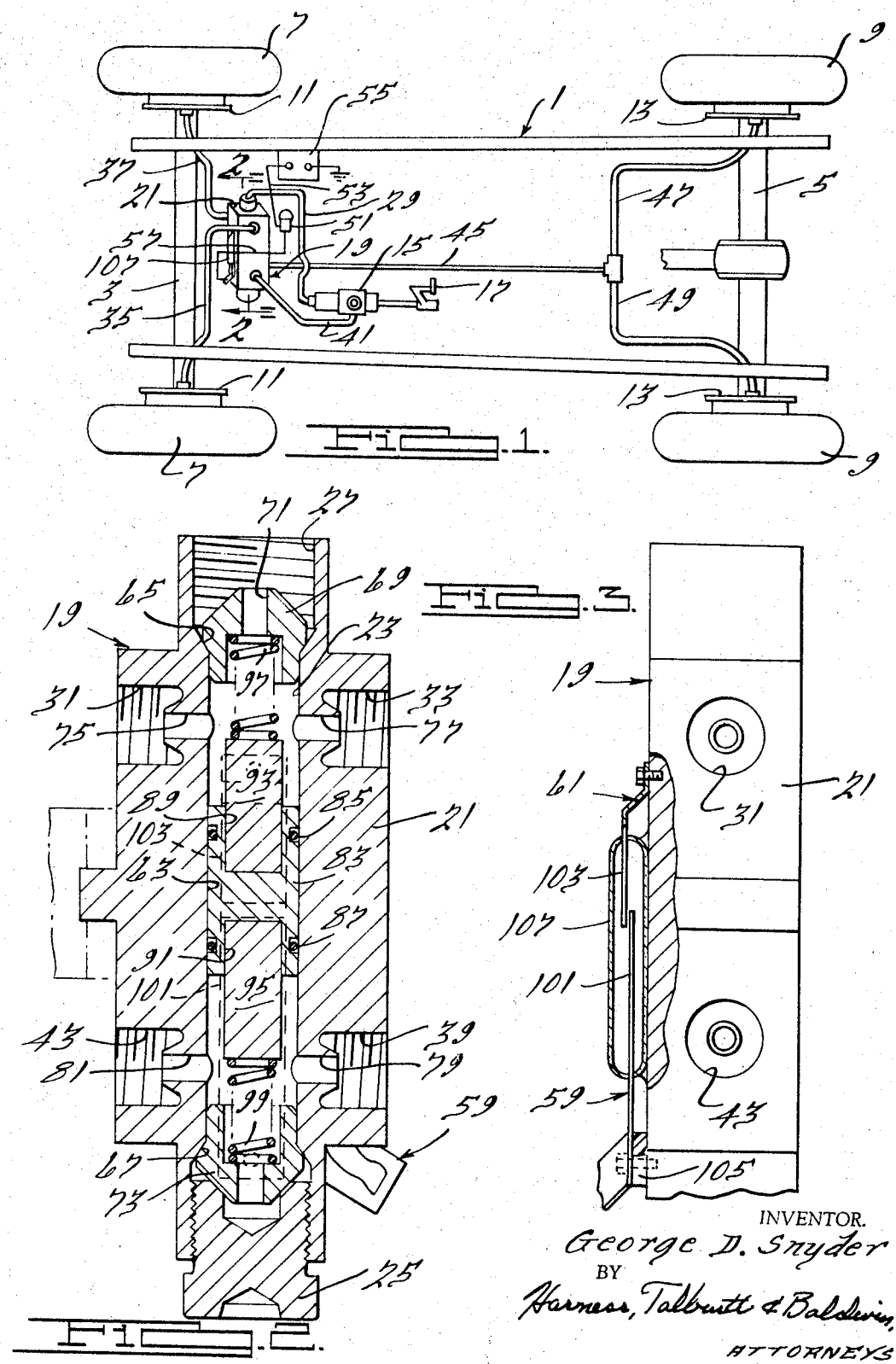

3,450,853
MAGNETICALLY OPERATED SIGNAL SWITCH FOR HYDRAULIC BRAKE SYSTEM
George D. Snyder, Oak Park, Mich., assignor to Chrysler Corporation, Highland Park, Mich., a corporation of Delaware
Filed Apr. 26, 1967, Ser. No. 633,925
Int. Cl. H01h 35/38
U.S. Cl. 200—82
2 Claims

ABSTRACT OF THE DISCLOSURE

Switch device adapted to close an electrical circuit through a warning lamp in event of leakage in one fluid circuit of a two fluid circuit hydraulic brake system of a vehicle. Device includes a housing having a pair of magnets movable as a unit in response to a predetermined pressure differential on opposite sides of the magnet unit, the magnet movement causing an external pair of contacts under the influence of the magnetic field to close, thereby closing the electrical circuit.

Background of the invention

This invention relates to warning switches, and more particularly to a switch adapted to close an electrical circuit through a signal device upon the failure or malfunctioning of the braking system of automotive vehicles.

Generally, automotive brake systems include a number of brake actuating devices, a fluid displacement mechanism or master cylinder, and a number of brake fluid circuits connecting the displacement mechanism with the brake actuating devices. However, a disadvantage of this type of brake system lies in the fact that a leak or break in one of the brake fluid circuits will allow the fluid in the whole system to drain therefrom, thereby rendering ineffective the entire brake system of the vehicle. To prevent such an occurrence, brake systems have been proposed which utilize a dual master cylinder with twin hydraulic fluid working chambers. One of the working chambers of the master cylinder is connected to the front wheel brakes to form a first brake circuit, while the other working chamber is connected to the rear wheel brakes to form a second independent brake circuit. Thus, if a leak should occur in one brake circuit, thereby rendering such circuit ineffective, the other brake circuit would remain effective when pressure is applied to the brake pedal. However, some vehicle operators do not detect any difference in vehicle braking even if only one brake circuit is operational. Accordingly, a signal has been built into the braking system to warn the operator in the event one of the brake circuits becomes ineffective. A number of hydraulic signal switch devices have been proposed, but many of them are disadvantageous from cost or mechanical standpoints. For example, some switches are placed in direct contact with the hydraulic brake fluid. Brake fluids are normally highly corrosive and relatively expensive parts must be utilized to prevent corrosive damage thereto.

Summary of the invention

Briefly, a switch of this invention includes a housing having a bore or passage therein, a body in said bore and movable therein upon the creation of different pressures at opposite ends of the body, magnetic field creating means carried by the body, a pair of contacts movable between an open position and a closed position, the contacts being spaced from the bore and adapted to be affected by the magnetic field of the aforementioned means, and the contacts being adapted for movement from one position to another upon a predetermined movement of the magnetic field creating means.

One of the primary objects of this invention is to provide a warning switch device for a hydraulic brake system of a vehicle, which is adapted to be actuated to cause a signal to be given to the vehicle operator when a brake circuit is rendered ineffective.

Another object of this invention is to provide a warning switch device of the class described in which switch contacts are not affected by hydraulic brake fluid.

A further object of this invention is to provide a warning switch device such as described which is responsive to the creation of different field pressures in two hydraulic brake circuits.

Still another object of this invention is to provide a warning switch device of the type described which is simple and economical in construction, and effective in operation.

Other objects and advantages of this invention will become apparent as the description progresses.

Brief description of the drawings

In the accompanying drawings, in which one of various possible embodiments of this invention is illustrated, FIG. 1 is a plan view of the chassis of an automotive vehicle with the warning switch apparatus of this invention diagrammatically shown therewith;

FIG. 2 is an enlarged section taken generally along line 2—2 of FIG. 1; and

FIG. 3 is a side view of the warning switch of this invention as viewing from the left-hand side of FIG. 2, certain parts being broken away and shown in section for clarity.

Like parts are indicated by corresponding reference characters throughout the several views of the drawings.

Description of the preferred embodiment

Referring now to FIG. 1 of the drawings, an automotive vehicle frame is indicated generally at 1. Attached to frame 1 are a front axle 3 and a rear axle 5 carrying front and rear wheel 7 and 9, respectively. Conventional hydraulic brake actuating assemblies 11 and 13 are respectively attached to the front and rear wheels and axles. The brake actuating assemblies function to brake the wheels when fluid is forced to them, and upon decrease of fluid pressure the assemblies function to force the fluid back toward its source, as is well known.

A fluid displacement mechanism in the form of a tandem or dual master cylinder 15, such as disclosed in U.S. Patent 3,149,468, for example, is attached to the frame in a suitable location. Master cylinder 15 is connected to and operated by a brake pedal 17. The dual master cylinder has two working chambers and is adapted to supply hydraulic brake fluid under pressure to the front brake actuating assemblies 11 by one circuit and to the rear brake actuating assemblies 13 by another circuit, as will be made apparent hereinafter.

Both fluid circuits include the device 19 of this invention. More particularly, the device 19 comprises a housing 21, preferably formed of non-magnetic material and having a longitudinally extending passage or bore 23 therein. One end of passage 23 is closed by a plug 25 and the other end of the passage forms an inlet 27 connected by a fluid conduit 29 to one of the working chambers of master cylinder 15. Outlets 31 and 33 in housing 21 are in communication with inlet 27 and are connected by fluid conduits 35 and 37, respectively, to the opposite front wheel brake actuating assemblies 11. Another inlet 39 in housing 21 is connected by a fluid conduit 41 to the other working chamber of master cylinder 15. Inlet 39 is in communication with an outlet 43 through passage 23. A fluid conduit 45 extends from outlet 43 rearwardly toward the rear of the vehicle. Conduit 45 branches into two conduits 47 and 49 which are connected to opposite rear wheel brake actuating assemblies 13.

One terminal of a signal device, such as a lamp 51, is connected by an electrical line 53 to a source of electrical energy, such as a battery 55. The other terminal of lamp 51 is connected by a line 57 to one electrical contact 59 of device 19. Another electrical contact 61 of device 19 is connected to the ground side of battery 55.

Referring now to FIG. 2, it will be seen that passage 23 has a central bore portion 63 the diameter of which is slightly smaller than the diameter of the end portions of the bore. Bore portion 63 is stepped adjacent the opposite end portions of the passage to provide tapered shoulders 65 and 67. A cup-shaped fitting 69 having a port 71 therein is seated against shoulder 65 with a portion of the fitting being pressed into the central bore portion 63. A similar fitting 73 is pressed into the central portion at the opposite end of the latter. Plug 25 closes the end of the passage 23 adjacent fitting 73. Housing 21 has ports 75, 77, 79, 81, respectively, connecting outlets 31 and 33, inlet 39, and outlet 43 with the passage 23.

A piston or carrier body 83 is slidably mounted in central bore portion 23 and has annular recesses at its opposite end portions in which O-ring seals 85 and 87 are located for preventing leakage of hydraulic fluid from one end of passage 23 to the other end of the passage. The opposite ends of body 83 are recessed as indicated at 89 and 91 for receiving end portions of two elongated magnets 93 and 95, respectively. Magnets 93 and 95 are positioned in carrier body 83 so that similar magnetic poles of the magnets, such as the south poles for example, are adjacent or face one another.

The carrier body 83 and magnets 93 and 95 are normally held in a central position in bore portion 23 by two biasing members, such as springs 97 and 99, extending between the bottom of the cup-shaped fitting 69 and magnet 93 and between the bottom of the cup-shaped fitting 73 and magnet 95, respectively. The springs 97 and 99 are adapted to exert equal and opposite forces on the carrier and magnet assembly.

It is desirable that the device be actuated to energize the signal lamp 51 only when the operator applies the vehicle brakes. This is because experience has shown that if a signal is continuously energized, the operator may become indifferent to the warning and the device thereby loses its effectiveness. The springs 97 and 99 are adapted to exert a force on the magnets which is greater than the force exerted against the magnets by the hydraulic fluid when the latter is under normal residual pressure. Thus, even if a leak develops in one of the fluid circuits the carrier 83 and magnets 93 and 95 are held in their central position against the bias of the residual pressure exerted thereon by the other fluid circuit.

Contacts 59 and 61 are formed of reeds or blades 101 and 103, respectively, adapted to be influenced by the magnetic fields of the magnets 93 and 95. Contact 59 is insulated from housing 21 by an insulator 105. The free end of contact 59 underlies the free end of contact 61 inside an enclosed contact housing 107 secured to housing 21. As shown, the other end of contact 61 is grounded and connected to housing 21. The free ends of contacts 59 and 61 are in relatively close proximity to the magnets 93 and 95. When the magnets 93 and 95 and carrier body 83 are in their central positions, it is believed that the magnetic fields of the adjacent poles of the magnets are induced in the free ends of the contacts so that such free ends are of the same polarity and hence are repelled from each other. Thus, the contacts remain in an open position. If the carrier body 83 and magnets 93 and 95 move a predetermined distance toward either fitting 69 or fitting 73, it is believed that the change in position of the magnetic fields causes the induced polarity of the free end of one of the contacts to reverse and the induced magnetic field of the free end of the other contact to be increased, thereby causing the free ends of the contacts to move together. In any event, it has been found that when the carrier body 83 is in its central position, the contacts remain open as a result of the forces exerted thereon by the magnets. When the carrier body 83 moves a predetermined distance toward fitting 69 or fitting 73, the free ends of the contacts move toward one another and close as a result of the forces exerted thereon by the magnets.

Operation of the device of this invention is as follows:

In normal operation, the master cylinder 15, the first or front wheel brake fluid circuit comprising conduit 29, inlet 27, port 71, passage 23, ports 75, 77, outlets 31 and 33, conduits 35 and 37 and brake actuating assemblies 11, and the second or rear wheel brake fluid circuit comprising conduit 41, inlet 39, port 79, passage 23, port 81, outlet 43, conduits 45, 47 and 49 and brake actuating asemblies 13 are completely filled with hydraulic fluid which is under a residual pressure of about 10 pounds per square inch. Accordingly, carrier body 83 and magnets 93, 95 are maintained in the positions shown in FIG. 2. Upon depression of brake pedal 17 the fluid pressure in each circuit increases considerably. However, the pressures in the circuit are substantially equal so that carrier 83 and magnets 93, 95 do not move. Thus, contacts 59 and 61, and hence the circuit through signal lamp 51, remain open.

If one of the brake circuits, such as the front wheel circuit for example, should develop a leak, due to an accident for example, the pressure in the front wheel circuit will be reduced considerably below the residual pressure in the rear wheel brake fluid circuit. However, as mentioned previously, the spring 97 exerts sufficient force on the magnet 93 and carrier 83 to prevent any significant movement of the latter due to the residual pressure in the rear wheel brake circuit.

When pressure is applied against the brake pedal 17 the pressure exerted on magnet 95 and the adjacent end of carrier 83 will be much greater than the pressure in the front wheel brake fluid circuit which has the aforementioned leak. As the pressure differential increases, carrier 83 and magnets 93 and 95 are forced toward fitting 69 against the bias of spring 97, thereby changing the magnetic field exerted on contacts 59 and 61. When the pressure differential reaches a predetermined value, such as 200 pounds per square inch, for example, the effect of the magnetic field exerted by the magnets on the contacts will be such as to cause the contacts 59 and 61 to close. Upon closure of contacts 59 and 61 a circuit is completed through lamp 51 and the latter is energized to warn the vehicle operator of the damage to one of the brake fluid circuits.

When the operator releases the brake pedal, the pressure in the rear wheel brake circuit will drop to the normal residual pressure which will again be greater than the pressure in the damaged front wheel brake fluid circuit. However, carrier 83 and magnets 93, 95 will return substantially to the positions shown in FIG. 2 since the force exerted thereon by springs 97 is greater than the residual hydraulic pressure acting on the magnet 95 and carrier 83. The contacts 59 and 61 will thereby be opened and lamp 29 will be deenergized.

It will be seen that the switch device of this invention is constructed in such a manner that the contacts 59 and 61 are not in physical contact with the brake fluid, thereby preventing the possibility of contact damage due to corrosive effects of the fluid. Moreover, the contacts are not subject to the high fluid pressures of the system so that costly sealing techniques are avoided. In addition, since the carrier 83 and magnets 93 and 95 are maintained in the central portion of passage 23 even after a leak has developed in one of the brake fluid circuits and there is no pressure on the brake pedal, the damaged fluid circuit can be repaired and refilled without a need for disassembling the switch device.

In view of the foregoing it will be seen that the several objects and advantages of this invention are achieved.

It will be understood that the invention is not to be limited to the exact constructions shown and described, but that various changes and modifications may be made without departing from the spirit and scope of the invention, as defined in the appended claims.

I claim:

1. In an automotive vehicle having front and rear hydraulic fluid brake actuating assemblies, a safety hydraulic brake control system including a master cylinder connected to the front brake actuating assembly by a first hydraulic circuit and to the rear brake actuating assembly by a second circuit, an electrical signal means operable for signalling loss of pressure in one of the brake circuits, and a switch device for closing an electrical circuit through the signal means; said switch device comprising a nonmagnetic housing having a passage therein, a carrier movably disposed in said passage, said housing having a first opening therein connecting said passage adjacent one end of said carrier to said first hydraulic circuit for enabling hydraulic fluid to flow into said passage and exert pressure on said one end of said carrier, and a second opening connecting said passage adjacent the other end of said carrier to said second hydraulic circuit for enabling hydraulic fluid to flow into said passage and exert pressure on said other end of said carrier, said carrier including a pair of magnets, a pair of contacts spaced from said passage and adapted to be affected by the magnetic field created by said magnets, said contacts comprising a pair of elongated reed contacts, one end of each reed contact being connected to said housing, the other ends of said reed contacts being adjacent one another in said magnetic field, and a second housing surrounding said other ends of said reed contacts, said contacts being movable relative to one another between an open and a closed position, and moving from one position to another upon a predetermined movement of said magnetic field creating means.

2. In an automotive vehicle as set forth in claim 1, wherein opposite ends of said carrier have recesses therein, one said magnet being located in said recess at said one end of said carrier and the other magnet being located in said recess at said other end of said carrier, said magnets having one pair of similar magnetic poles closer to one another than the other pair of similar magnetic poles.

References Cited

UNITED STATES PATENTS

| | | | |
|---|---|---|---|
| 3,327,079 | 6/1967 | Widl | 200—82 |
| 3,358,097 | 12/1967 | Kersting | 200—82 |
| 3,366,758 | 1/1968 | Bentzen et al. | 200—82 |

ROBERT K. SCHAEFER, *Primary Examiner.*

H. BURKS, *Assistant Examiner.*

U.S. Cl. X.R.

335—205; 340—52